(12) United States Patent
Schulte

(10) Patent No.: US 6,953,072 B2
(45) Date of Patent: Oct. 11, 2005

(54) TIRE FOR VEHICLES, IN PARTICULAR FOR MOTORCYCLES

(75) Inventor: Rüdiger Schulte, Winterberg (DE)

(73) Assignee: Continental Aktiengesellschaft, Hannover (DE)

( * ) Notice: Subject to any disclaimer, the term of this patent is extended or adjusted under 35 U.S.C. 154(b) by 307 days.

(21) Appl. No.: 10/349,823

(22) Filed: Jan. 23, 2003

(65) Prior Publication Data

US 2003/0136491 A1 Jul. 24, 2003

(30) Foreign Application Priority Data

Jan. 23, 2002 (DE) .......................... 102 02 674

(51) Int. Cl.$^7$ .............................. B60C 9/20; B60C 9/22; B60C 9/00
(52) U.S. Cl. .................. 152/527; 152/533; 152/531
(58) Field of Search ................ 152/533, 531, 152/527

(56) References Cited

U.S. PATENT DOCUMENTS

| | | | | | |
|---|---|---|---|---|---|
| 5,436,076 | A | * | 7/1995 | Nakata et al. | 428/377 |
| 5,558,144 | A | * | 9/1996 | Nakayasu et al. | 152/527 |
| 5,849,121 | A | * | 12/1998 | Reuter | 152/527 |
| 6,062,284 | A | | 5/2000 | Caretta | |
| 6,186,205 | B1 | * | 2/2001 | Oshima et al. | 152/517 |
| 6,401,779 | B1 | * | 6/2002 | Riva et al. | 152/527 |
| 2004/0256044 | A1 | * | 12/2004 | Riva et al. | 152/527 |

FOREIGN PATENT DOCUMENTS

| | | |
|---|---|---|
| EP | 0 461 646 B1 | 12/1991 |
| EP | 1 097 824 A2 | 5/2001 |
| EP | 1 213 159 A2 | 6/2002 |
| EP | 1 284 318 A1 | 2/2003 |
| GB | 1487426 * | 9/1974 .................. 156/531 |
| GB | 2 283 215 A | 5/1995 |
| WO | 01/90478 A1 | 11/2001 |

OTHER PUBLICATIONS

Continental Tyres. ContiForce Max, Online. Oct. 2002. URL:☐☐http://www.conti-tyres.co.uk/contibike/ti%20contiforcemax.shtml.*

Continental Tyres. ContiForce Max, Online. URL:☐☐http://www.conti-online.com/generator/www/de/en/continental/motorcycle/themes/motorcycletires/sport/force_max/force_max_en.html.*

Continental Tyres. ContiForce Max, Online. URL:☐☐ttp://www.conti-tyres.co.uk/contibike/motorcycle_tyresafety.shtml.*

* cited by examiner

Primary Examiner—Blaine Copenheaver
Assistant Examiner—Chris Schatz
(74) Attorney, Agent, or Firm—Laurence A. Greenberg; Werner H. Stemer; Ralph E. Locher

(57) ABSTRACT

A tire for vehicles, particularly for motorcycles, includes a 0°-cord coil incorporated in vulcanized rubber. The cord utilized for the 0°-cord coil has at least one rubberized strand of wires wound into a coil and has a load-elongation curve with an at least approximately linear region. The cord remains in the approximately linear region when the tire is in the finished, uninflated state as well as when the tire is inflated to the operating pressure. As a result, the running characteristics of the tire are improved. The slope in the approximately linear region of the load-elongation curve is between 0.05% and 0.2% per 10 N.

15 Claims, 3 Drawing Sheets

TIRE FOR VEHICLES, IN PARTICULAR FOR MOTORCYCLES

BACKGROUND OF THE INVENTION

FIELD OF THE INVENTION

The invention relates to a tire for vehicles, particularly for motorcycles, with a vulcanized rubber structure having a 0°-cord coil incorporated in the vulcanized rubber. At least one rubberized strand of wires, which are helically wound, forms the cord for the 0°-cord coil. The cord has a load-elongation characteristic curve with a region that is at least approximately linear.

Tires for two-wheeled vehicles, particularly high-speed motorcycles, have a tread with a convex curvature transverse to the direction of motion, so that there is a sufficient contact surface on the ground, and so that the vehicle is held stably on the road when the motorcycle has a banking angle necessary for driving around curves. Such tires are customarily fabricated by forming a cylindrical carcass which is formed of one or more rubberized fabric plies and to which a cord coil is applied. The turns of the cord coil are disposed next to one another and extend parallel to one another in the circumferential direction. Due to the large number of turns of the cord coil, the turns are oriented practically 0° relative to the direction of travel, hence the term 0°-cord coil. Due to the coil-shaped or helical winding, the angle of the turns with respect to the direction of travel deviates slightly from 0° but is always less than 5° and usually less than 2°. Even when there is such a deviation in angle, the winding is referred to as a 0°-cord coil.

After forming the belt with the cord coil, the tread band is applied and glued to the belt of the carcass. A pre-shaping so as to form the convex tread layer is performed. The final molding, including tread pattern formation, is performed in a vulcanization oven having a centripetal exterior against which the fabricated belt structure is pressed from the radially inner side by of a steam-heated bellows.

European Patent No. EP 0 461 646 B1, corresponding to U.S. Pat. No. 6,062,284, describes a tire of the above-mentioned type and a method for fabricating such a tire. This document describes the general fabrication steps and the structure of the 0°-tire. According to European Patent No. EP 0 461 646 B1, cords are utilized which exhibit a load-elongation characteristic that is formed by two linear portions with greatly differing slopes and a curved transition region. In the tire fabrication process, the cord is pre-elongated by 1.5% during vulcanization, so that the cord coil is already in the curved region of the load-elongation diagram after fabrication but before inflation to an operating pressure. This achieves that the tire "grows" into its final form almost completely during the fabrication process and practically does not "grow" any more when the tire is inflated, because the cord coil practically no longer stretches due to the large slope of the load-elongation curve.

Tires of this type have been on the market as motorcycle tires for some time. As it turns out, the running characteristics of these tires with respect to handling and undesirable "wobbling" (in curves as well as straight running) appear to be in need of improvement.

SUMMARY OF THE INVENTION

It is accordingly an object of the invention to provide a tire which overcomes the above-mentioned disadvantages of the heretofore-known tires of this general type and which is improved with respect to its running characteristics.

With the foregoing and other objects in view there is provided, in accordance with the invention, a tire configuration, including:

a tire including vulcanized rubber;
a 0°-cord coil incorporated in the vulcanized rubber;
the 0°-cord coil including a cord having at least one rubberized strand of helically wound wires;
the cord having a load-elongation characteristic with an at least substantially linear region;
the load-elongation characteristic having a slope between 0.05% and 0.2% per 10 N in the at least substantially linear region; and
the cord being in the substantially linear region of the load-elongation characteristic when the tire is in a finished, uninflated state and also when the tire is inflated to a given operating pressure.

In other words, according to the invention, a tire for vehicles, particularly for motorcycles, is provided with a structure of vulcanized rubber into which a 0°-cord coil is incorporated, wherein the cord which is utilized for the cord coil is formed of at least one rubberized strand of wires which are wound into a coil and wherein the cord has a region with an at least approximately linear load-elongation curve, wherein the cord remains in the approximately linear region in the finished, uninflated state of the tire as well as upon inflation to operating pressure, and wherein the slope in the approximately linear region is between 0.05% and 0.2% per 10 N.

As explained above, the turns or windings of the cord coil are disposed next to one another and extend parallel to one another in the circumferential direction of the tire. The turns are oriented at substantially 0° relative to the direction of travel and hence the term 0°-cord coil. Because of the coil-shaped or helical winding, the angle of the turns with respect to the direction of travel deviates slightly from 0° but is always less than 5° and usually less than 2°. The definition of a 0°-cord coil includes cord coils that have such slight deviations in angle.

The tire according to the invention is based on the idea of allowing elongations or stretching of the cord coil, and thus of the tire as a whole, even after inflation to operating pressure. The elongation or stretching in the inflated state is allowed in the same manner as in the uninflated state, so that, upon inflation to operating pressure, on one hand the tire elongates or "grows" into its intended shape for operation, and on the other hand the tire retains good elasticity and therefore acts as a primary spring system in the contact between the vehicle and the road. This is guaranteed by the relatively small slope of the load-elongation curve of the cord.

Surprisingly, the running characteristics of the tire according to the invention are appreciably more advantageous in comparison to conventional tires with respect to handling, that is to say when the motorcycle banks in a curve, and with respect to wobbling or swinging in curves and straight running. With respect to "fluttering," the tire according to the invention is on a par with conventional tires.

According to another feature of the invention, the slope in the at least substantially linear region of the load-elongation characteristic is between 0.07% and 0.15% per 10 N.

The tire according to the invention can operate with a substantially smaller pre-elongation. For instance, in the finished but uninflated state, the cord of the tire according to the invention has an elongation of less than 0.5%, and preferably between 0.1 and 0.3%.

Inflated to operating pressure, the cord elongation is between 0.5 and 1.4%, and preferably under 1.3% or even under 1.2%.

In the preferred embodiments, this elongation is above 0.8% or above 0.9%. The elongation of the cord in the inflated state is thus appreciably less than that of the tire described in European Patent No. EP 0 461 646 B1, whose elongation typically is 1.5% already in the uninflated state.

Other features which are considered as characteristic for the invention are set forth in the appended claims.

Although the invention is illustrated and described herein as embodied in a tire for vehicles, particularly motorcycles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
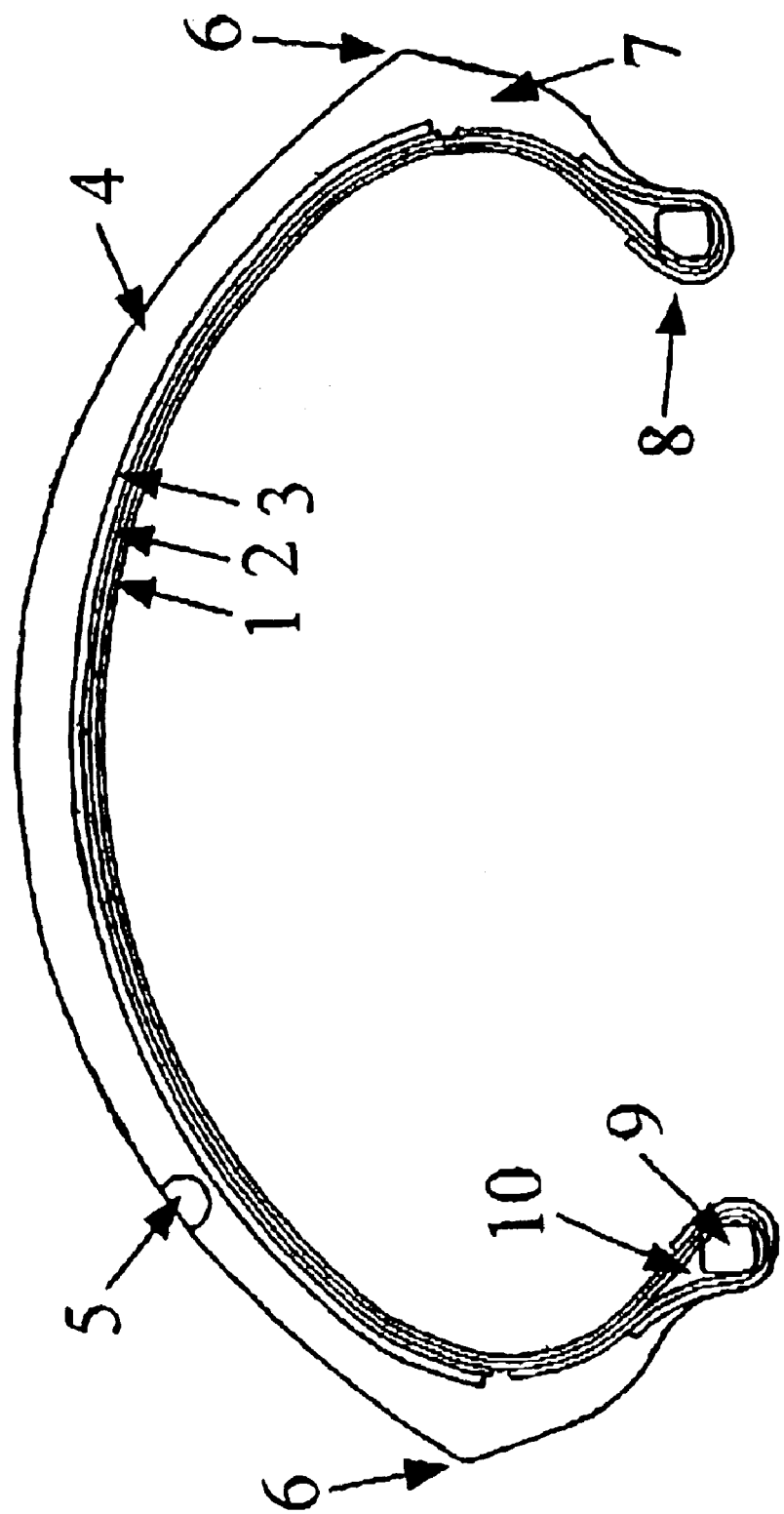
FIG. 1 is a diagrammatic cross-sectional view of a motorcycle tire according to the invention.

Referring now to the figures of the drawings in detail and first, particularly, to FIG. 1 thereof, there is shown the structure of a motorcycle tire which includes, from its inner side to its outer side, a carcass 1, 2 with an inner core 1 that guarantees air-tightness and at least one fabric ply; a belt formed by a cord coil 3; and an outer tread ply 4 with incorporated grooves 5. The tread ply 4 arcs convexly and extends to endpoints 6, at which the tire has its largest width. Adjoining the tread ply and pointing away from the convex curvature of the tread 4 are sidewalls 7, each of which opens into a bead 8 in which a bead core 9 is formed from inextensible steel wires. The fabric ply 2 of the carcass 1 wraps around the bead core 9 from the radially inner side to the radially outer side. The resulting internal space is filled with a core filler 10 made of rubber. The bead 8 serves for securely fastening the tire to a rim.

The cord coil 3 is wrapped evenly around the tire circumferentially from one side to the other in surrounding fashion, such that a 0°-coil is formed in which the turns of the cord coil 3 are aligned parallel to one another in the direction of motion, except for a small angle due to the helical winding.

Figure 2:
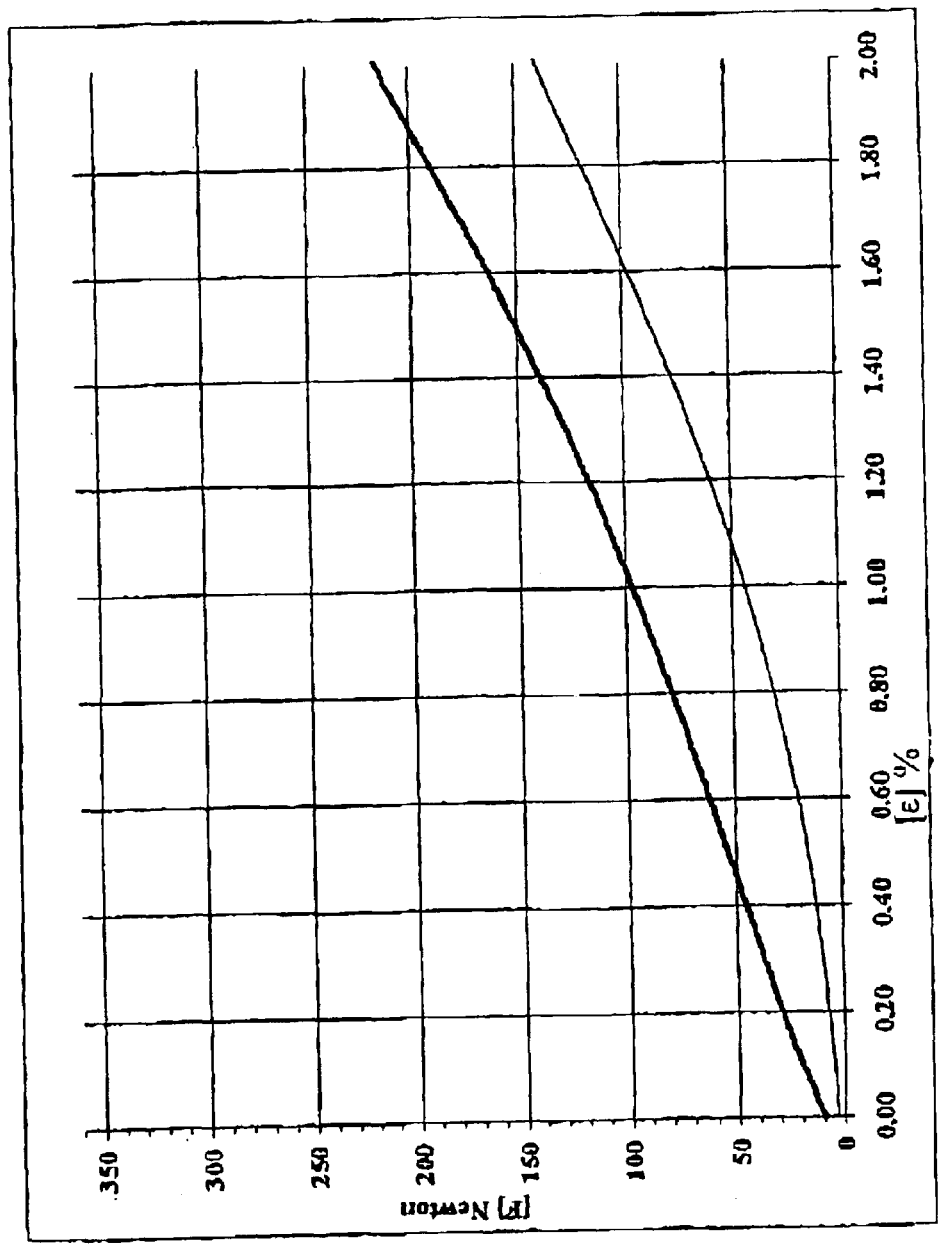
FIG. 2 is a graph illustrating characteristic curves of a cord according to the invention.

FIG. 2 illustrates characteristic curves for a cord used in accordance with the invention with rubberizing and without rubberizing, wherein the y-axis indicates the force F in Newton and the x-axis indicates the elongation $\epsilon$. The thin curve for the cord without rubberizing still has a slight curvature, whereas the load-elongation characteristic for the rubberized and vulcanized cord (thick line) is nearly linear. What is meant by "nearly linear" is that the curve has a nearly constant slope; i.e., its slope varies by no more than 100%. The slope of the curve for the rubberized cord is between 0.07% and 0.13% elongation for 10 N of applied force.

Figure 3:
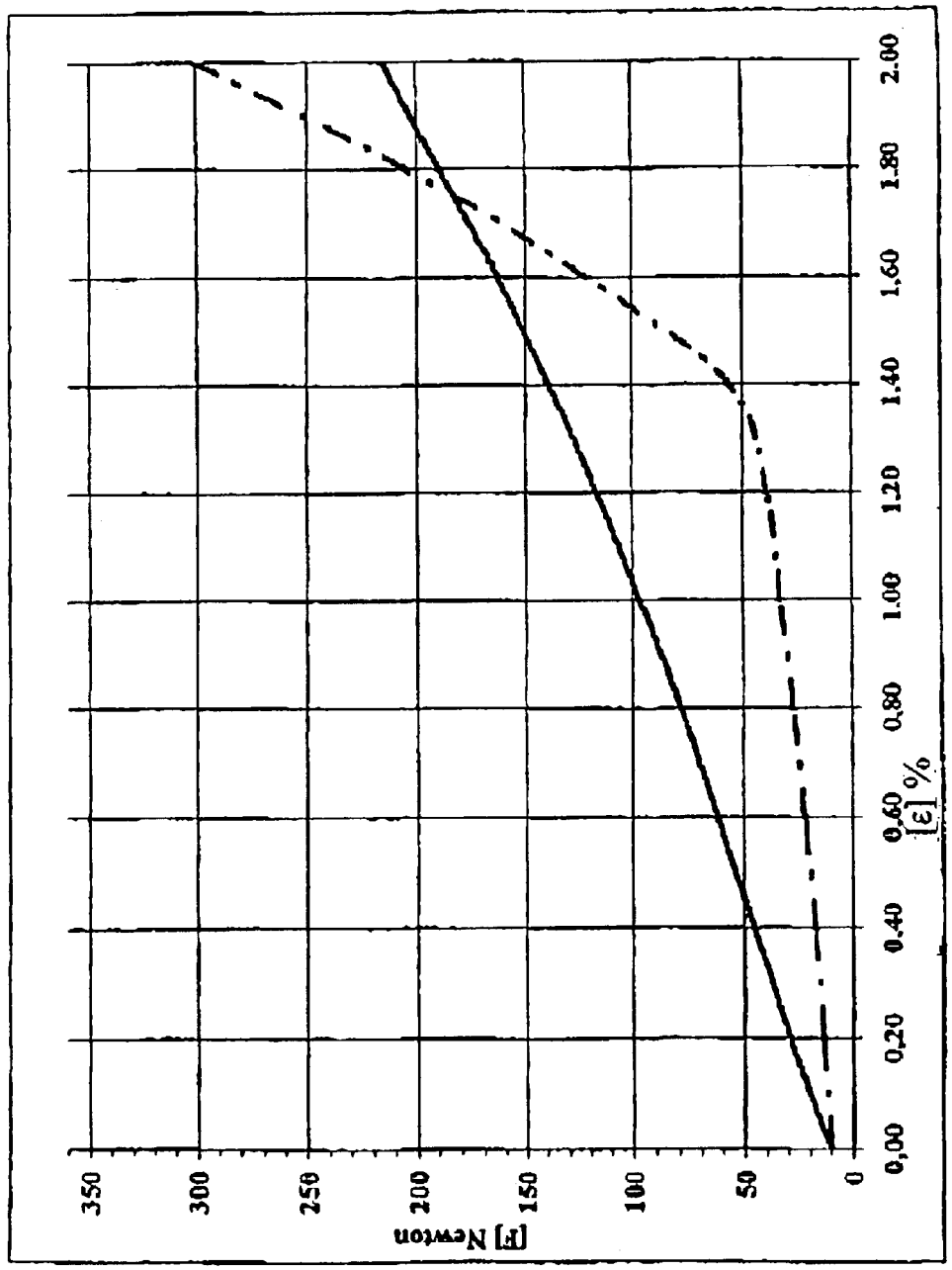
FIG. 3 is a graph illustrating a comparison of characteristic curves for a cord according to the invention and a conventional cord.

FIG. 3 shows a comparison between the curves for the rubberized cord according to the invention from FIG. 2 and a cord of a commercially available tire according to European Patent No. EP 0 461 646 B1.

The curve for the non-rubberized cord of the conventional tire has a slope which varies between 0.6% per 10 N and 0.02% per 10 N, in other words slopes which differ by more than tenfold. The tire according to the invention is expediently fabricated so that the cord elongation is about 0.2%, preferably being between 0.1 and 0.3%, without inflation to operating pressure. Given inflation to operating pressure, the cord elongation is approximately 1.0%, preferably being between 0.9 and 1.2%, due to the pre-loading of the cord. In any event, the elongation never exceeds 1.4%, even upon inflation of the tire to operating pressure.

Whereas the cord according to European Patent No. EP 0 461 646 B1 is a so-called high-elongation cord (technically defined as a 3×4×0.2 cord), in the tire according to the invention a high-impact cord (technically defined as a 3×5×0.2 cord and made by Bekaert Corp.) was utilized. Otherwise substantially identical tires according to European Patent No. EP 0 461 646 B1, on one hand, and according to the invention, on the other hand, were subjected to test drives by professional test drivers. Table 1 shows the results that were obtained:

TABLE 1

|  | Tire according to the invention | Tire according to EP 0 461 646 B1 |
| --- | --- | --- |
| Flutter | 0 | 0 |
| Handling | + |  |
| Wobble: Curves | + |  |
| Wobble: driving straight | + |  |

The tire according to the invention thus offers appreciable advantages in driving behavior, particularly with respect to the important parameters of handling and wobble.

Although the structure and characteristics of the tire according to the invention have been described for two-wheeled vehicles, the invention can also be applied to tires for multi-wheeled vehicles, particularly automobiles, such that a quiet operation of the tires and adhesion to the road is improved.

I claim:

1. A tire configuration, comprising:

a tire including vulcanized rubber;

a 0°-cord coil incorporated in said vulcanized rubber;

said 0°-cord coil including a cord having at least one rubberized strand of helically wound wires;

said cord having a load-elongation characteristic with a given region;

said load-elongation characteristic having a slope between 0.05% and 0.2% per 10 N in said given region and said slope varying by no more than 100% in said given region; and said cord being in said given region of said load-elongation characteristic when said tire is in a finished, uninflated state and also when said tire is inflated to a given operating pressure.

2. The tire configuration according to claim 1, wherein said slope in said given region of said load-elongation characteristic is between 0.07% and 0.15% per 10 N.

3. The tire configuration according to claim 1, wherein said cord has an elongation of less than 0.5% when said tire is in said finished, uninflated state.

4. The tire configuration according to claim 1, wherein said cord has an elongation between 0.1 and 0.3% when said tire is in said finished, uninflated state.

5. The tire configuration according to claim 1, wherein s-aid cord has an elongation between 0.5 and 1.4% when said tire is inflated to said given operating pressure.

6. The tire configuration according to claim 1, wherein said cord has an elongation between 0.5 and 1.3% when said tire is inflated to said given operating pressure.

7. The tire configuration according to claim 1, wherein said cord has an elongation between 0.5 and 1.2% when said tire is inflated to said given operating pressure.

8. The tire configuration according to claim 1, wherein said cord has an elongation between 0.8 and 1.4% when said tire is inflated to said given operating pressure.

9. The tire configuration according to claim 1, wherein said cord has an elongation between 0.8 and 1.3% when said tire is inflated to said given operating pressure.

10. The tire configuration according to claim 1, wherein said cord has an elongation between 0.8 and 1.2% when said tire is inflated to said given operating pressure.

11. The tire configuration according to claim 1, wherein said cord has an elongation between 0.9 and 1.4% when said tire is inflated to said given operating pressure.

12. The tire configuration according to claim 1, wherein said cord has an elongation between 0.9 and 1.3% when said tire is inflated to said given operating pressure.

13. The tire configuration according to claim 1, wherein said cord has an elongation between 0.9 and 1.2% when said tire is inflated to said given operating pressure.

14. The tire configuration according to claim 1, wherein said tire is a vehicle tire.

15. The tire configuration according to claim 1, wherein said tire is a motorcycle tire.

* * * * *